United States Patent [19]

Huang

[11] Patent Number: 5,298,041
[45] Date of Patent: Mar. 29, 1994

[54] PLANT TRAY WITH DETACHABLE BOTTOM

[75] Inventor: Barney K. Huang, Raleigh, N.C.

[73] Assignee: Barney K. Huang, Raleigh, N.C.

[21] Appl. No.: 643,330

[22] Filed: Jan. 22, 1991

[51] Int. Cl.$^5$ .............................................. A01B 79/02
[52] U.S. Cl. ........................................ 47/58; 47/73; 47/78
[58] Field of Search ................ 47/66, 87, 73, 77, 78, 47/58

[56] References Cited

U.S. PATENT DOCUMENTS

| | | | |
|---|---|---|---|
| 2,048,873 | 7/1936 | Kruse | 47/73 |
| 3,712,252 | 1/1973 | Huang | 47/87 |
| 4,312,152 | 1/1982 | Drury | 47/87 |
| 4,389,814 | 6/1983 | Andreason | 47/87 |
| 4,716,680 | 1/1988 | Whitcomb | 47/66 |

FOREIGN PATENT DOCUMENTS

| | | | |
|---|---|---|---|
| 1-86918 | 1/1989 | Japan | 47/77 |
| 2029681 | 3/1980 | United Kingdom | 47/73 |

*Primary Examiner*—Henry E. Raduazo

[57] ABSTRACT

The present invention entails a plant tray that includes a plurality of individual plant cells with each cell having an open top and bottom. Each plant cell is designed to contain and hold a plant growing medium such as peat cake or peat-soil mix. A detachable screen secured to the bottom of the plant tray to provide air-pruning of plant roots can be conveniently removed from the plant tray to facilitate extraction of the individual plants from the plant tray. Air-pruning is the phenomenon in which plant roots emerging through the screen base of the plant tray shrivel due to contacting drier air. This promotes secondary root growth or root branching and eliminates root binding and root tangling resulting in enhanced plant growth. A number of different structural designs are provided for detachably securing the screen to the plant tray. For example, in one embodiment, the plant tray is provided with a plurality of spaced apart openings while the detachable screen is provided with a series of projecting pins that are designed to project into and through the various openings so as to detachably secure the screen to the plant tray structure.

1 Claim, 5 Drawing Sheets

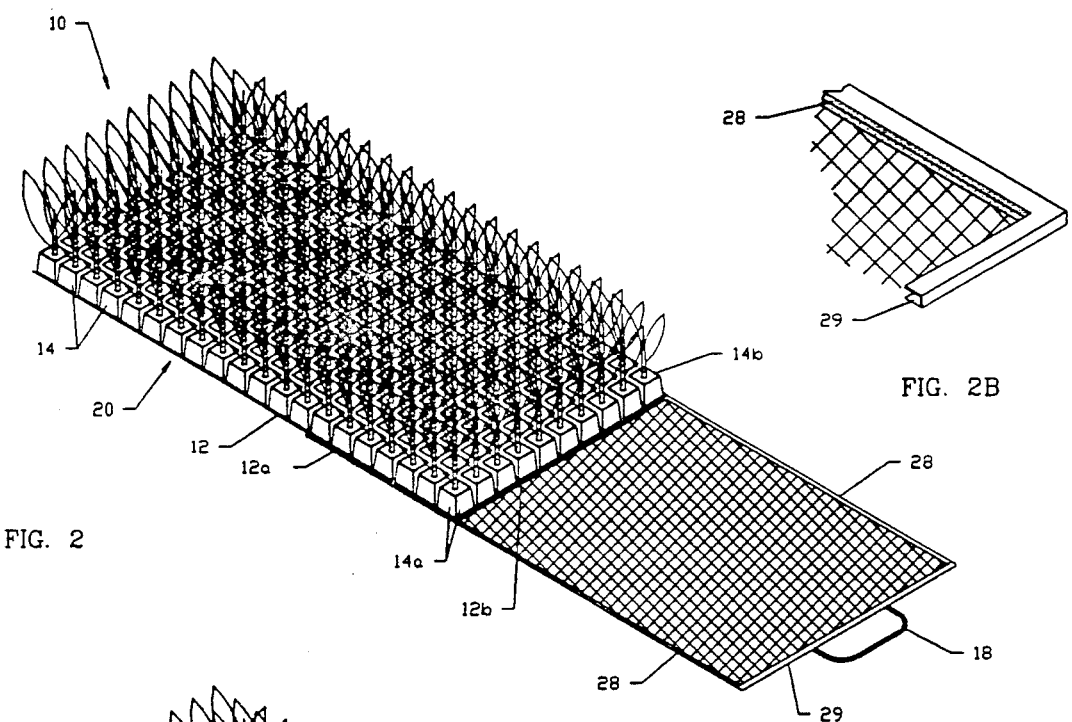
FIG. 2
FIG. 2B
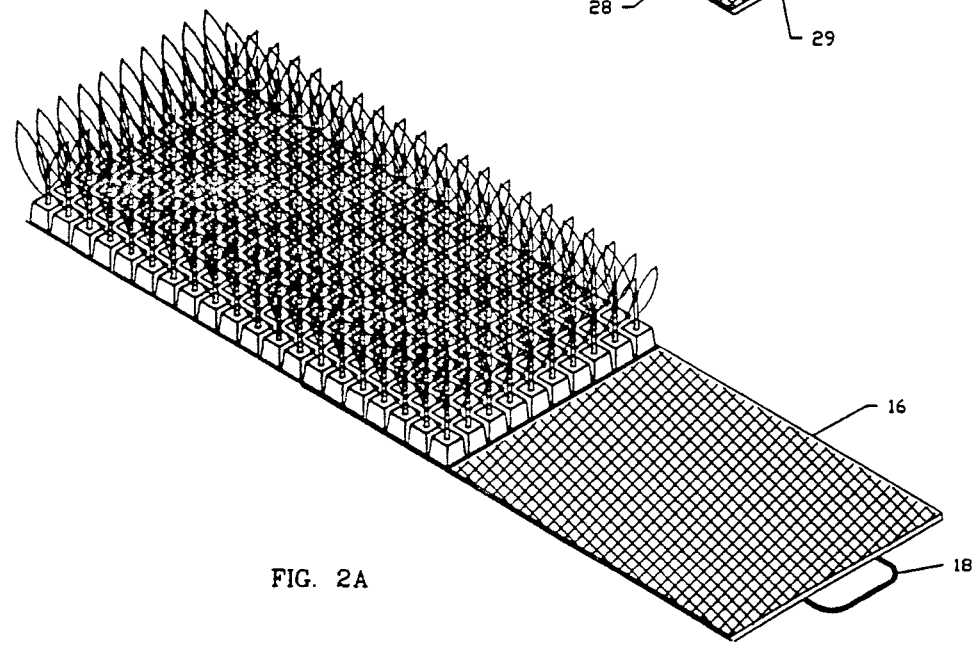
FIG. 2A

PLANT TRAY WITH DETACHABLE BOTTOM

FIELD OF THE INVENTION

The present invention relates to plant trays and more particularly to a detachable screen structure for a plant tray that effects air-pruning for superior plant growth and which retains plant growing medium within the plant tray.

BACKGROUND OF THE INVENTION

Plant tray structures are widely used in greenhouse and planting operations today. A problem associated with a conventional plant tray is root-tangling or root-binding which deter development of the plant roots after the plants are transplanted. As an example of air-pruning plant growing trays which prevents root-binding, one is referred to the disclosure found U.S. Pat. No. 3,712,252.

One particular important application for plant trays is their use in conjunction with an automatic transplanter such as that disclosed by Dr. Barney K. Huang in U.S. Pat. No. 3,446,164. In such a case, the plant tray includes a series of plant cells that are open about the bottom and top with the plant extending from the top of each individual cell. Because of the particular taper of such a plant tray and because the bottom of the plant tray is open, it has been appreciated that individual plants can be extracted from the bottom of the plant tray and directed into the field by an automatic transplanter. However, one particular problem that has been presented with an open bottom plant tray of the type being discussed; is it is very difficult to confine and hold the plant growing medium, such as peat cake or peat mix, in the plant tray cells, especially during the early phases of the seed germination and root development. Again, it is important from the standpoint of providing air-pruning that the bottom of a plant tray be substantially open. Therefore, there has been and continues to be a need for a plant growing tray that will effectuate air-pruning but will still act to confine and retain the soil growing medium within the tray cells.

SUMMARY AND OBJECTS OF THE INVENTION

The present invention entails a plant growing tray that is designed to overcome the disadvantage and shortcomings of plant growing trays of the prior art. In particular, the plant growing tray of the present invention is provided with a detachable bottom or screen that effects air-pruning of the plant-.s within the tray and which also serves to hold and confine the plant growing medium within the tray. In the present disclosure, there are various means disclosed for detachably mounting or securing the screen to the bottom of the tray. Among the means disclosed is a system for securing a detachable screen to the main body of the plant tray through a series of spaced apart pins that extend from the screen and which are adapted to align with and extend through a series of spaced apart openings formed in the plant tray structure itself.

It is therefore an object of the present invention to provide a plant tray structure with a bottom screen that enables the plant tray to effect and carry out air-pruning and which also functions to retain and control plant growing medium contained within the plant tray.

Another object of the present invention resides in the provision of a plant tray structure having a detachable screen wherein the screen can be easily attached and detached from the plant tray structure.

Other objects and advantages of the present invention will become apparent and obvious from a study of the following description and the accompanying drawings which are merely illustrative of such invention.

BRIEF DESCRIPTION OF THE DRAWINGS

FIG. 2 is a perspective view of the plant tray structure of the present invention with the detachable screen being shown in a detached extended position (with an enlarged view of one corner) from the bottom of the tray structure.

FIG. 2A is a perspective view of the plant tray structure of the present invention showing a solid plate or screen pulled to an extended position with respect to the tray structure.

FIG. 2B is a fragmentary perspective view of a portion of the screen.

DETAILED DESCRIPTION OF THE INVENTION

Figure 1:
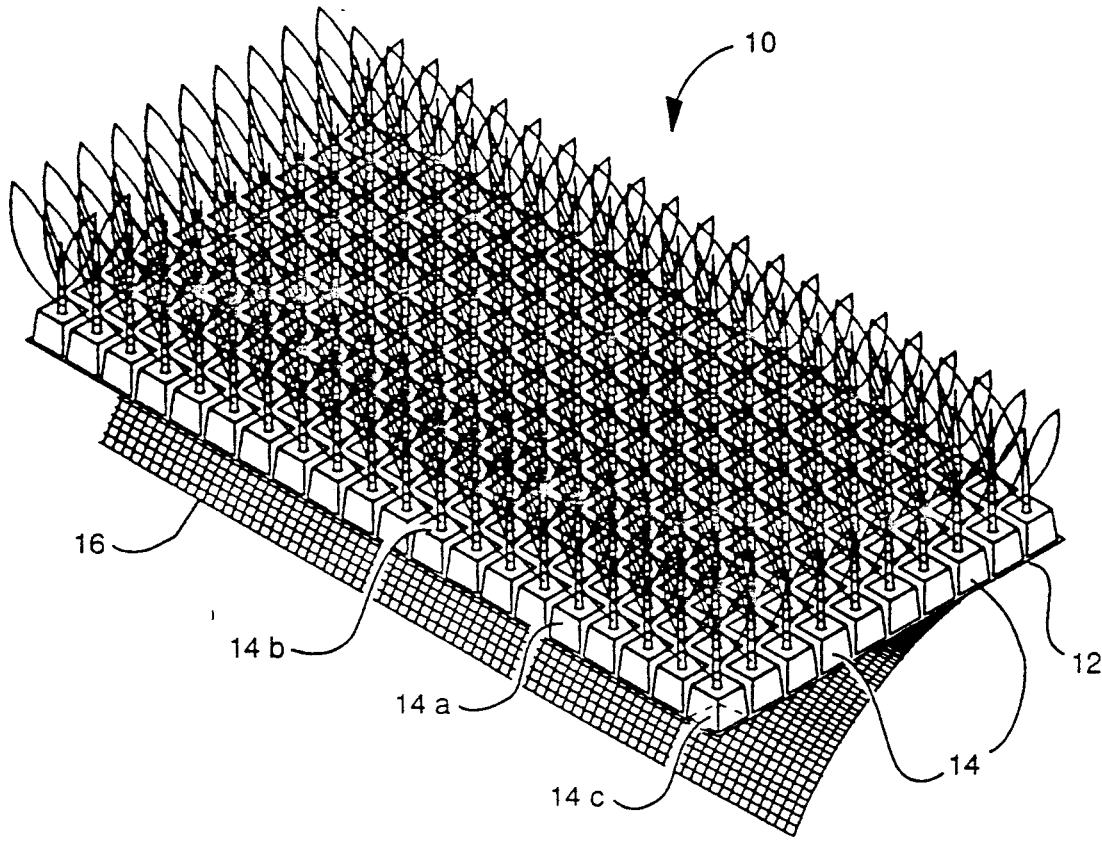
FIG. 1 is a perspective view of a plant tray with the detachable screen being shown in a partially detached position.

With further reference to the drawings, the plant tray structure of the present invention is shown therein and indicated generally by the numeral 10 in FIG. 1. Plant tray structure 10 includes a main plant holding body that comprises a base 12 and a plurality of aligned and uniformly spaced cells 14. As can be seen in the drawings, each cell 14 includes a reversed taper inasmuch as the respective cells become progressively wider from the top of the cell to the bottom of the cell. In particular, each cell includes a series of sides 14a, an open top 14b and an open bottom 14c. Each cell in practice is filled with a plant growing medium such as soil, loose peat mix, compressed peat cake or the like. It is appreciated that any conventional plant growing medium can be utilized in the plant tray 10 of the present invention.

Secured to the bottom of the main body of the plant tray structure 10 is a detachable screen 16. Screen 16 functions to allow the plant tray structure to effectively air prune the respective plant roots grown in the plant tray structure. In addition, the detachable screen 16 functions to hold and confine the plant growing medium within the main body of the plant tray structure 10. Detachable rigid screen 16 may be provided with a handle 18 such as illustrated in FIG. 2.

Figure 3:
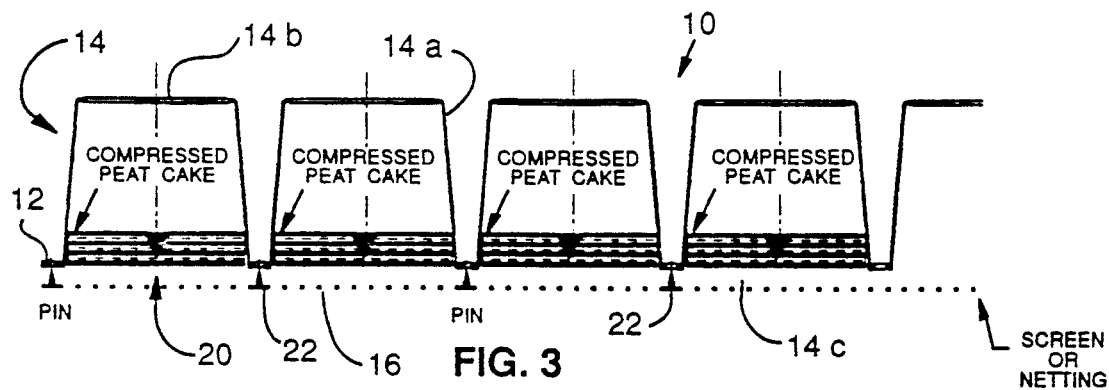
FIG. 3 is a fragmentary cross-sectional view that illustrates a pin type fastener for securing the screen to the main body of the plant tray structure.

Disclosed herein a series of means that may be employed to detachably secure screen 16 to the bottom or base 12 of the plant tray structure 10. First, attention is directed to FIG. 3 wherein the base 12 of the main body of the plant tray structure is provided with a series of openings 20 that are aligned and uniformly spaced about the bottom or base 12 of the plant tray structure. The outer portion of the base 12 forms a slide edge 12a (FIG. 5) that may be used as a slide support. See for example, FIGS. 2 and 5. As seen in FIG. 3, these openings 20 would preferably be aligned. Secured to the screen 16 and extending therefrom is a series of securing pins 22. Securing pins 22 are appropriately spaced and aligned such that they align with the respective openings 20 formed in the base 12. Pins 22 are particularly shaped such that they may be frictionally secured within the respective openings 20 so as to secure and hold tightly the screen 16 adjacent the bottom of the plant tray structure 10. It is thusly appreciated that the screen 16 in the embodiment of FIG. 3 can be quickly and easily attached to and detached from the main body of the plant tray structure 10 by simply engaging and disengaging the pins 22 with respected openings 20.

Figure 3A:
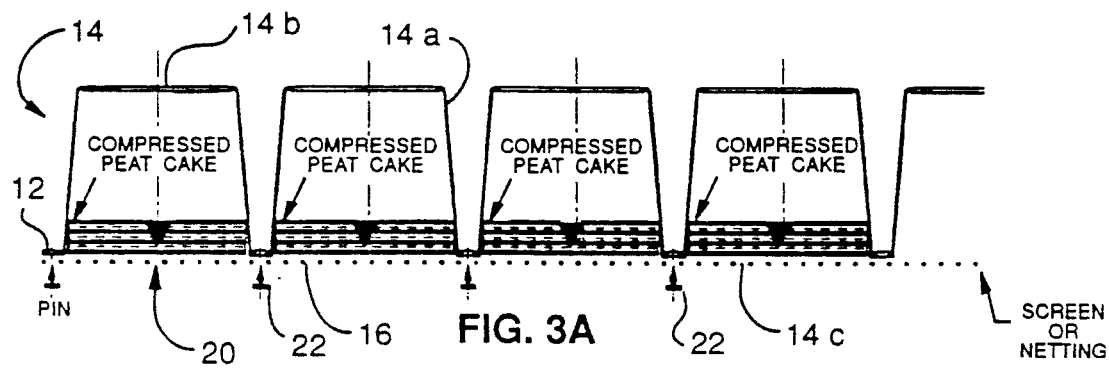
FIG. 3A is a fragmentary cross-sectional view that illustrates a pin type fastener where the pin is not integral with either the screen or tray.

FIG. 3A discloses yet another embodiment of the present invention that is similar in principal to the embodiment shown in FIG. 3. The basic difference is that in the embodiment illustrated in FIG. 3A the pins 22 are not integral with either the screen 16 or the tray structure but are independent separate pins 22.

Figure 4:
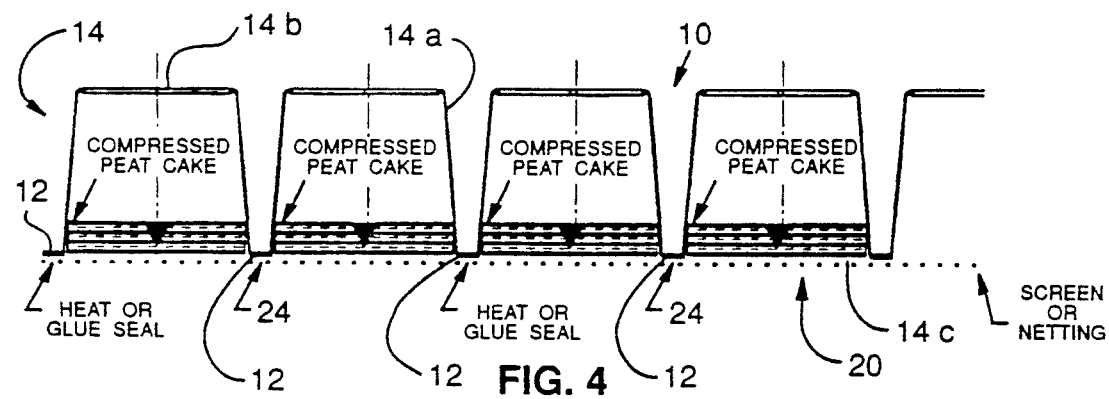
FIG. 4 is a fragmentary transverse sectional view of the plant tray structure of the present invention illustrating that the detachable screen can be secured to the main body of the plant structure through heat or glue.

Turning to FIG. 4, it is illustrated that the screen 16 may be detachably secured to the main body of the plant tray structure 10 by either a heat or glue seal 24. In this case, where the screen is secured through a heat or glue seal 24, it is appreciated that the screen can be simply pulled and stripped from the main body of the plant tray structure 10. Effectively, the screen simply peels from the secured seal area that exists between the main body of the plant tray structure 10 and the screen itself. In this embodiment it is anticipated that the screen 16 would be disposable and would not be repeatedly reused.

Figure 5:
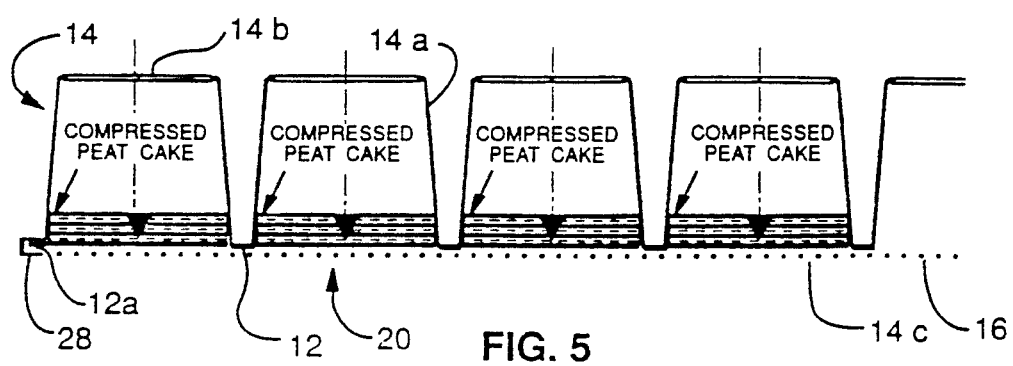
FIG. 5 is a fragmentary transverse sectional view showing the detachable screen being held adjacent the main body of the plant tray by a sliding groove structure.

Turning now to FIGS. 2 and 5 and another embodiment of the present invention, the lower portion of the main body of the plant tray structure 10 is provided with a two sided slide flange 12a and a catch flange 12b. Screen plate 16, on the other hand, is provided with a two sided slide groove 28 that extends outwardly from the screen and fits onto the slide flange 12a. Screen 16 also includes a catch groove 29 that mates with the catch flange 12b of the plant tray to provide for the secure attachment of the screen plate 16 to the tray. Thus, it is appreciated that the rigid screen or grid 16 shown in FIG. 5 can be simply moved into and out of engagement with the main body of the plant tray structure 10.

Turning to FIG. 2A, another design of the plant tray structure 10 of the present invention is shown therein. In this embodiment, the screen plate 16 which can be in the form of a non-attached screen or plate, can be used for tray tranferring and in practice is disposed underneath the tray structure so as to support the same in any transferring process. Thus, this support mechanism is repeatedly used under many trays, or top of trays when inverting the trays.

Figure 6:
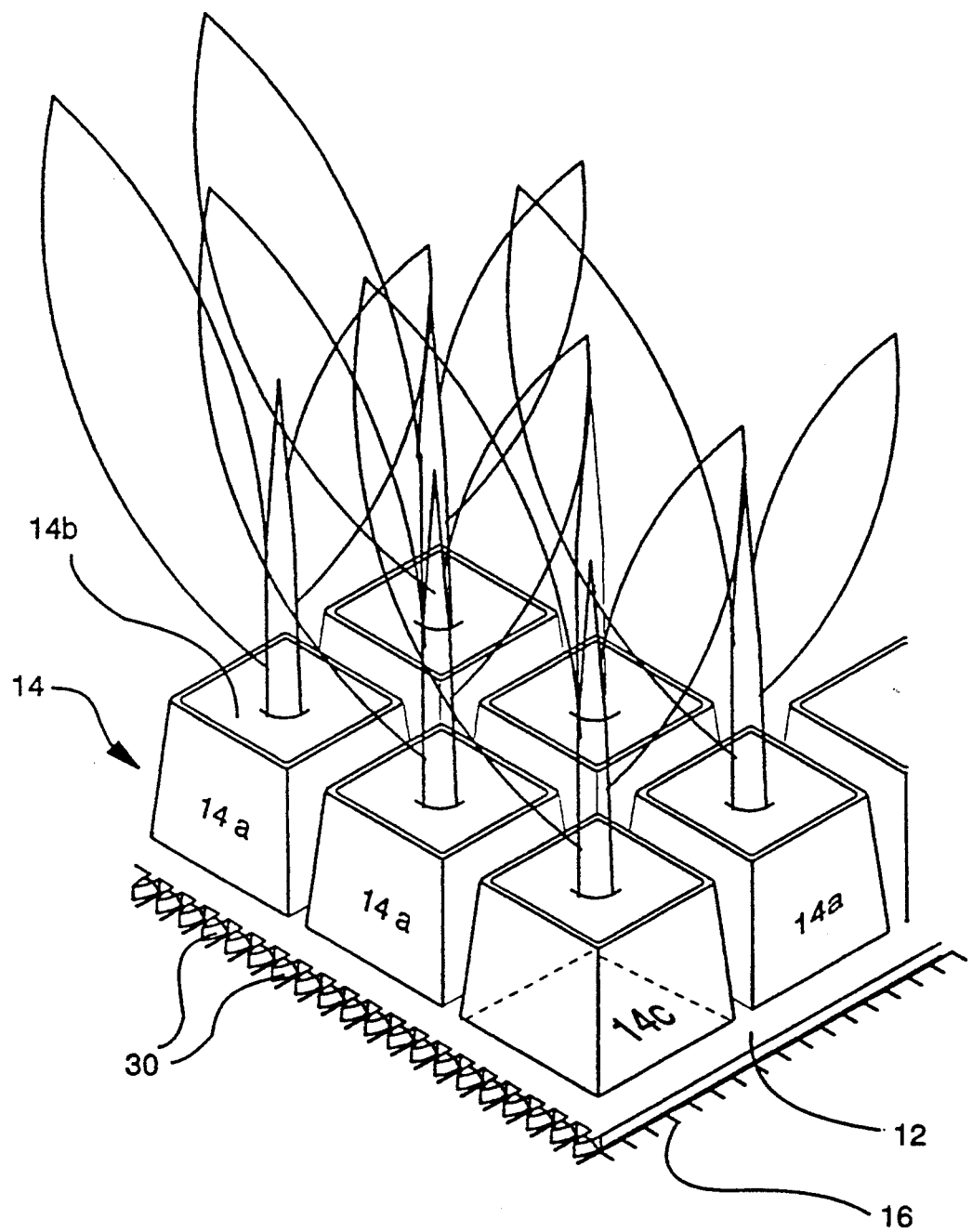
FIG. 6 is a fragmentary perspective view showing the detachable screen being secured to the main body of the plant tray structure through a series of teeth that project from the main body of the plant tray structure.

In FIG. 6, yet another embodiment of the present invention is shown and in this embodiment, the base 12 or lower portion of the main body of the plant tray structure 10 is provided along at least two opposite sides with a series of securing or attaching teeth 30. In the embodiment illustrated in FIG. 6 the screen 16 is of such a design that the opposite edges thereof is of an open mesh such that the edge of the netting or screen can be pulled and secured onto and over the securing teeth 30 such that the entire screen can be secured to the main body of the plant tray structure 10 by simply engaging the mesh edge of the screen 16 with the series of outwardly projecting teeth 30.

Figure 7:
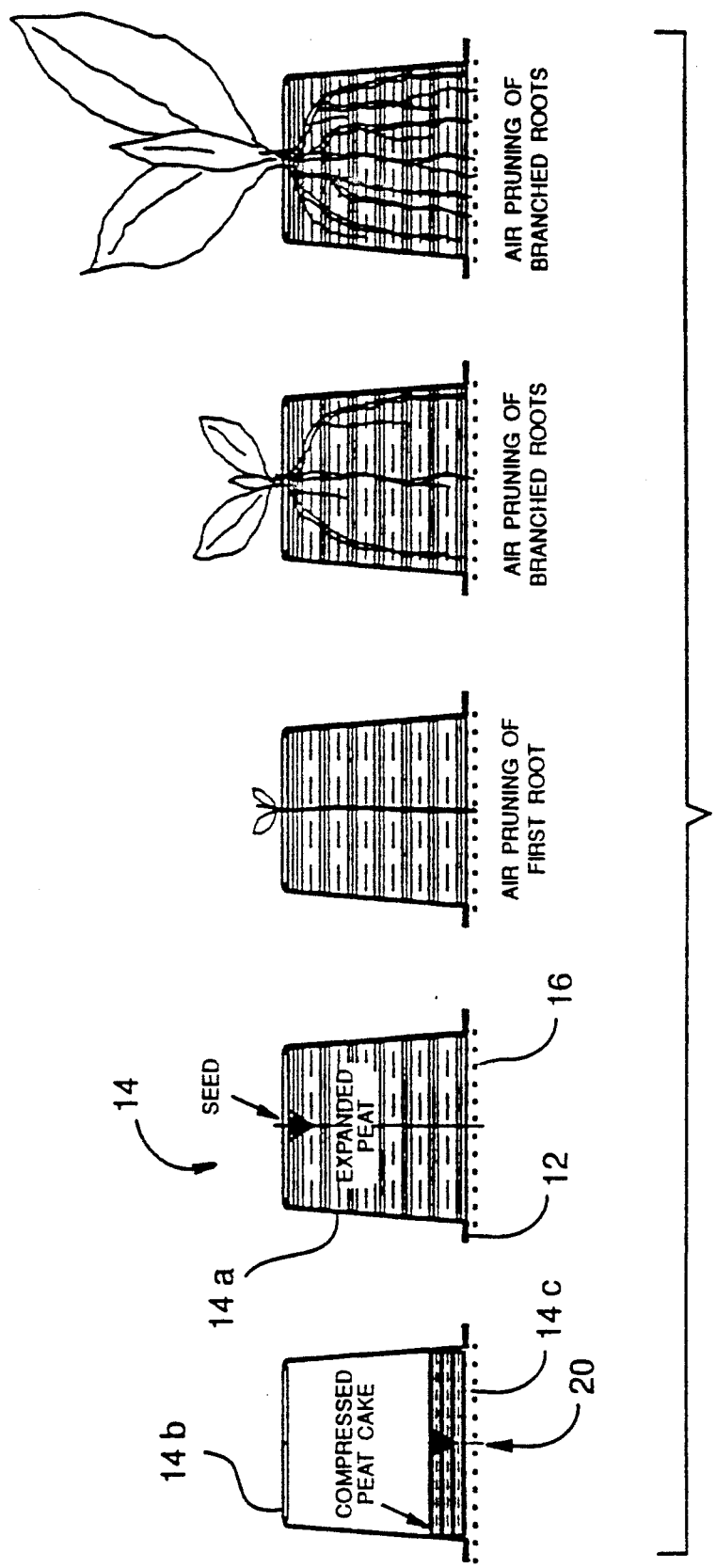
FIG. 7 is a series of views illustrating the plant tray structure of the present invention effectuating air-pruning.

In use, screen 16 can be detached from the main body of the plant tray structure 10, leaving the bottom of the plant tray structure completely open. The tray structure then can be inverted such that the bottom assumes a top position. In this posture, the plant tray can be filled with a plant growing medium such as loose peat mix or individual compressed peat cakes. It should be appreciated that the tray structure can be filled from either the top or the bottom. In some cases, it may be beneficial to use a solid or screen plate 16 (FIG. 2A) underneath the tray while the tray is being filled with soil, loose peat mix, compressed peat cake, or the like. Once the respective cells have been filled with the plant growing medium the screen 16 can be attached to the bottom thereof in any one of the ways described above or in any equivalent fashion. Thereafter, the plant tray structure 10 can be turned back to where the base 12 of the plant tray structure and the screen 16 assume a bottom position. (FIG. 7) In this position, the entire plant tray structure can be easily transported and moved from one location to another without the plant growing medium falling from the respective cells 14. Also, in this position, the respective cells can be seeded, germinated and grown to a transplanting size with effective air-pruning of roots for enhanced plant growth (FIG. 7).

Once the seeds have germinated and the plants have reached transplanting size, the plant tray structure of the present invention can be used in an automatic transplanting operation. To accomplish this, the screen 16, by any of the means described herein above, can be detached from the bottom of the main body of the plant tray structure so as to leave the bottom of the plant tray structure open. This allows a tray structure to be used in a manner where the respective plants in each cell 14 are extracted or pulled from the bottom of the plant tray structure by a fully automatic transplanter such as that disclosed in U.S. Pat. No. 3,446,164, or can simply be removed by hand. The plants can also be removed by pushing them from the top by manual, mechanical or pneumatic means as used by a conventional transplanter.

From the foregoing specification and discussion it is appreciated that the present invention entails a plant tray structure that lends itself to air-pruning but yet is provided with a bottom detachable screen that assists in confining and holding the plant growing medium within the plant tray structure.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A method of air-pruning plants within a plant tray and readying the plant tray for transplanting comprising the steps of:
   a) filling the plant tray with a plant growing medium;
   b) detachably securing a screen to the bottom of the plant tray so that the screen and tray become an integral structure;
   c) planting at least one seed or plant in said growing medium and growing the seed or plant in the growing medium to form roots;
   d) retaining the plant growing medium within the plant tray as the screen serves to hold and retain the plant growing medium within the tray and further air-pruning the plants as a result of the open screen being disposed about the bottom of the plant tray by permitting air to circulate below said screen to cause air pruning of said roots; and
   e) detaching the screen from the bottom of the plant tray such that plant material can be extracted downwardly from the bottom of the plant tray.

* * * * *